United States Patent
Thompson et al.

[11] 3,768,586
[45] Oct. 30, 1973

[54] VEHICLE GUIDANCE SYSTEM

[75] Inventors: Robert F. Thompson, Croydon, Pa.;
John W. McDonell, Newark, Calif.

[73] Assignee: Eaton Corporation, Cleveland, Ohio

[22] Filed: Nov. 23, 1971

[21] Appl. No.: 201,520

[52] U.S. Cl.................... 180/98, 318/587, 180/79.1
[51] Int. Cl......................... B60k 27/06, B62d 1/24
[58] Field of Search...................... 180/98, 79.1, 79; 318/587, 608, 588; 246/187 B

[56] References Cited
UNITED STATES PATENTS

| | | | |
|---|---|---|---|
| 3,147,817 | 9/1964 | Deliban................................. | 180/98 |
| 3,038,970 | 6/1962 | Paluka.............................. | 180/98 X |
| 3,468,391 | 9/1969 | Rushing et al........................ | 180/98 |
| 3,609,676 | 9/1971 | Sauquet............................... | 180/98 |
| 3,669,208 | 6/1972 | Brooke................................. | 180/98 |
| 2,847,080 | 8/1958 | Zworykin et al............... | 180/79.1 X |

*Primary Examiner*—Kenneth H. Betts
*Attorney*—Teagno & Toddy

[57] ABSTRACT

A vehicle guidance system includes first and second current-carrying conductors defining a portion of the vehicle guide path and in which current flows. The current in one conductor is equal in magnitude to 90° and out of phase with the current in the other conductor. The conductors, when located in a parallel substantially overlapping relationship, establish a magnetic field having an effective phase different from the phase of the current in either conductor. The conductors are separated at at least one point of divergence to define separate vehicle guidepaths. A sensor unit on the vehicle sense the magnetic field of the conductors and controls the steering of the vehicle. The circuit which responds to the sensing unit is selectively controlled so that an output signal from only one or the other of the conductors controls the vehicle steering. In addition, the sensor unit which is on the vehicle senses data located along the guidepath in the form of lobes or nodes defined by the conductors. Furthermore, the sensor functions to sense phase modulation in the guidepath conductors as controlled from a central processor, and additional circuit means senses a change in phase modulation in the current flowing through the conductors and provides an output in response thereto so that data can be transmitted to the vehicle by phase modulation of the current transmitted through the guidepath conductors.

15 Claims, 14 Drawing Figures

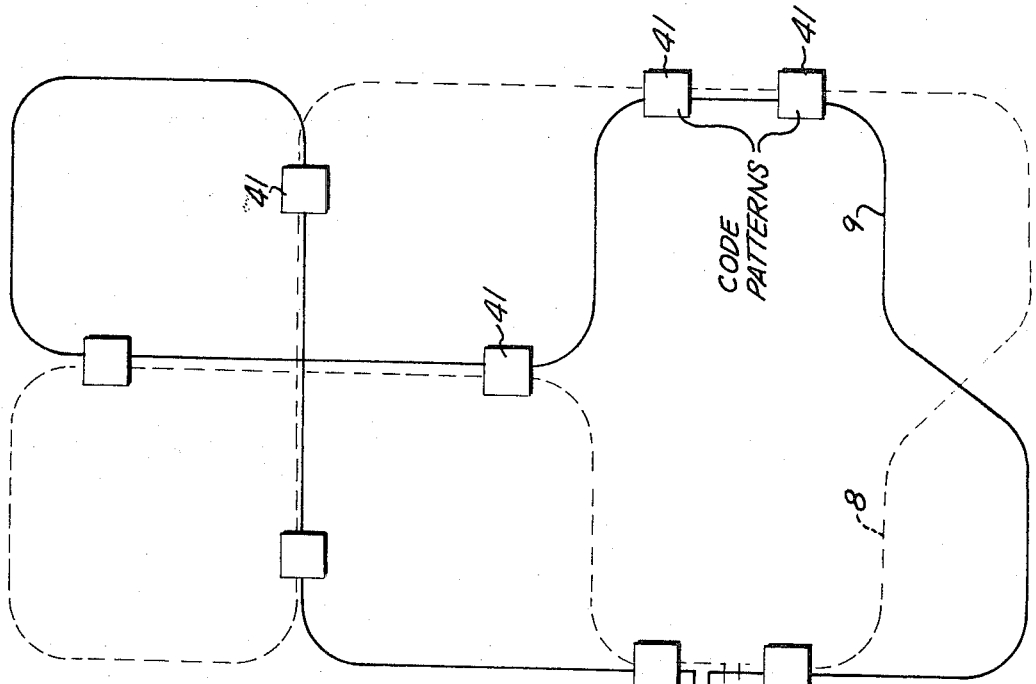
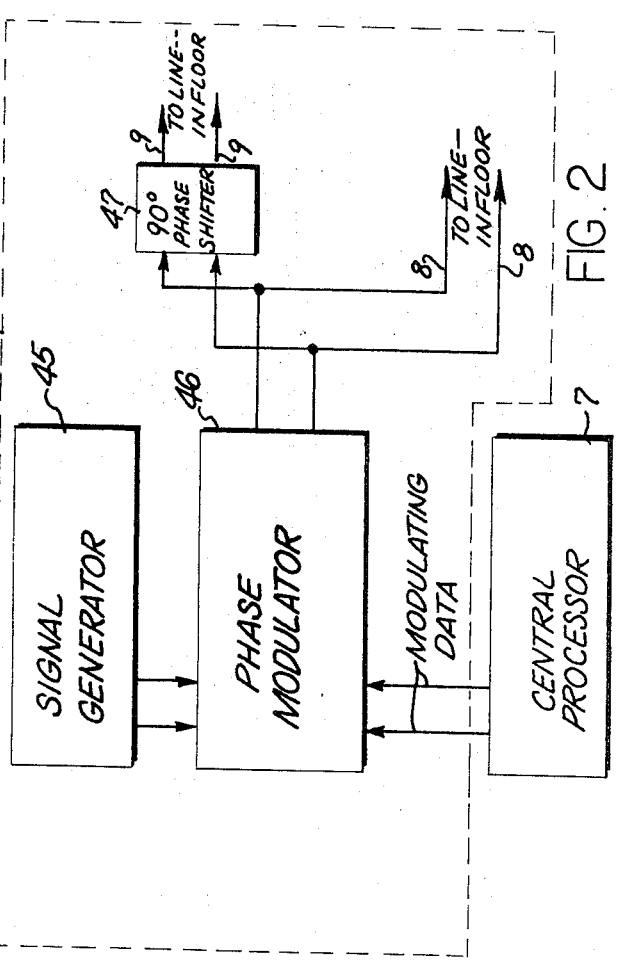
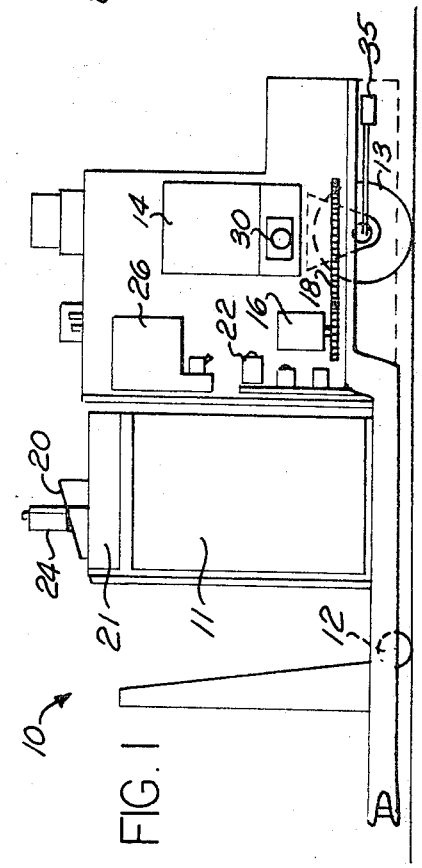

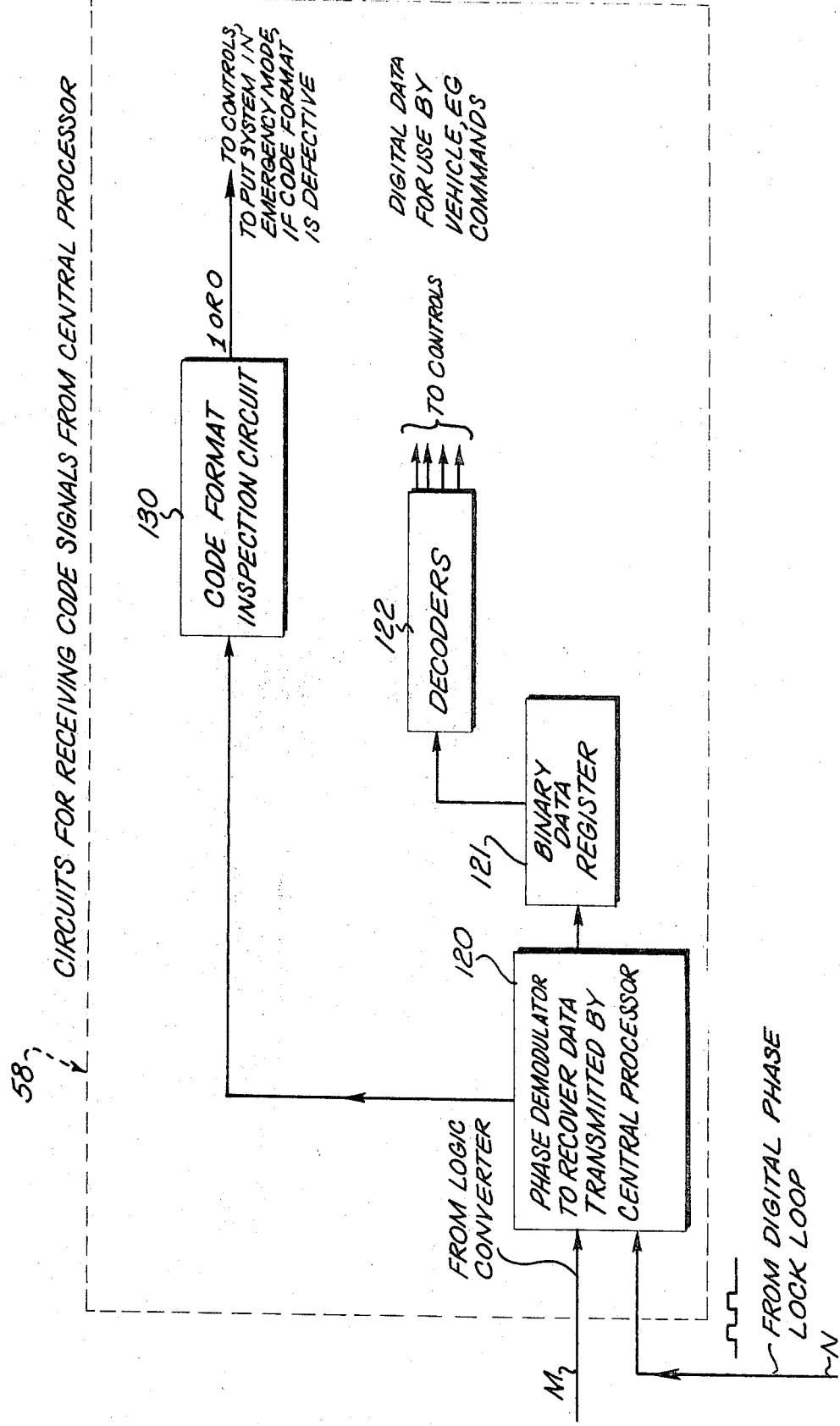

VEHICLE GUIDANCE SYSTEM

BACKGROUND OF THE INVENTION

The present invention relates to improvements in guidance vehicle systems and, more particularly, to a system in which a vehicle with a sensor unit thereon follows a guidepath defined by a current-carrying conductors.

Many systems have been developed to control the movement of a vehicle along a guidepath so that the vehicle follows the current-carrying conductor means which define the vehicle guidepath. Also, much effort has been directed to controlling the vehicle so that the vehicle may take selected guidepaths at different times. In addition, coded information along the guidepath has been sensed by sensors on the vehicle for purposes of controlling vehicle operation. In addition, efforts have been made of transmit data to the vehicle by certain controls of the current in the guidepath conductors. Typical patents directed to one or more of the above concepts are U.S. Pat. Nos. 3,147,817; 3,411,603 and 3,512,601.

SUMMARY OF THE PRESENT INVENTION

The present invention is directed to a vehicle guidance system in which current-carrying conductor means define the vehicle guidepath. The system of the present invention is relatively simple and provides for control of the vehicle at selected points along the guidepath so that the vehicle may ultimately traverse different guide paths. In addition, the system is such that coded information located along the guidepath can be readily sensed by the vehicle and primarily by the same sensor that controls the vehicle steering and path selection. In addition, the same sensor unit is capable of picking up signals from a central processor which controls some aspect of the current in the guidepath conductors.

More specifically, the guide path is defined by first and second current-carrying conductors with the current in one conductor being of a different phase than the current in the other conductor. The conductors, when in a parallel overlying relationship, establish a magnetic field having an effective phase summation from the current in both conductors. The conductors at points of divergence are separated to define separate guidepaths and, of course, the separated conductors each establish a magnetic field having a phase different from that of the other conductor and different from that of the effective phase. A sensor unit on the vehicle senses the magnetic field of the guidepath and controls a steering-responsive means to effect steering of the vehicle along the guidepath. At points of divergence of the guidepath, the circuit which responds to the sensor is controlled so that an output signal to the steering means is provided under the control of only one of the conductors. Such a control in the present invention is effected because of the fact that the circuit means is phase responsive and the control of the circuit is effected so that the circuit does respond to the phase of one conductor only.

In addition, the present invention provides code signals along the guidepath and which code signals are in the form of lobes or nodes formed by the conductors. The sensor unit detects the conductors at each node establishing a node magnetic field having a phase characteristic dependent upon the conductor arrangement in the node and specifically dependent upon which portion of the node is defined by the conductor which has a current phase leading or lagging the current phase of the other conductor. The sensor unit on the vehicle senses the magnetic field of the node and particularly the phase characteristic of the node and a phase-responsive circuit means receives control signals from the sensor unit and provides an output signal depending upon the sensed phase characteristic of the magnetic field of the node.

Furthermore, the present invention provides for the transmission of data to the vehicle by changing the phase of the current carried in the guidepath conductors, and the same sensor means which senses the magnetic fields of the conductors responds to a change in phase of the current in the conductors and provides a signal to circuit means which responds to the change in phase so that data can be transmitted to the vehicle by changing the phase of the current transmitted through the guidepath conductors.

Accordingly, the present invention, which basically is a phase-responsive system, is such that a single sensor units in combination with control circuitry (1) operates to control vehicle steering along the guidepath, (2) controls path selection of the vehicle at appropriate locations in the guidepath, (3) senses code data located along the guidepath, and (4) senses data transmitted to the vehicle along the guidepath conductors.

FIGURE DESCRIPTION

Other advantages and features of the present invention will become apparent upon consideration of the description hereinbelow made in conjunction with the accompanying drawings wherein:

FIG. 1 is a schematic side view of a vehicle, which moves along a guidepath and is to be controlled as it traverses the guidepath, with the side panel removed to show the location of some of the components of the system;

FIG. 2 is a block diagram of a guidepath power circuit which provides current to the guidepath conductors;

FIG. 2A is a plan view of the layout of conductors which define various routes for the vehicles;

FIG. 9 is a block diagram of receiving circuits on the vehicle for demodulating and decoding signals transmitted to the vehicle from a central processor by way of the guide conductors.

DESCRIPTION OF PREFERRED EMBODIMENT

Figure 3:
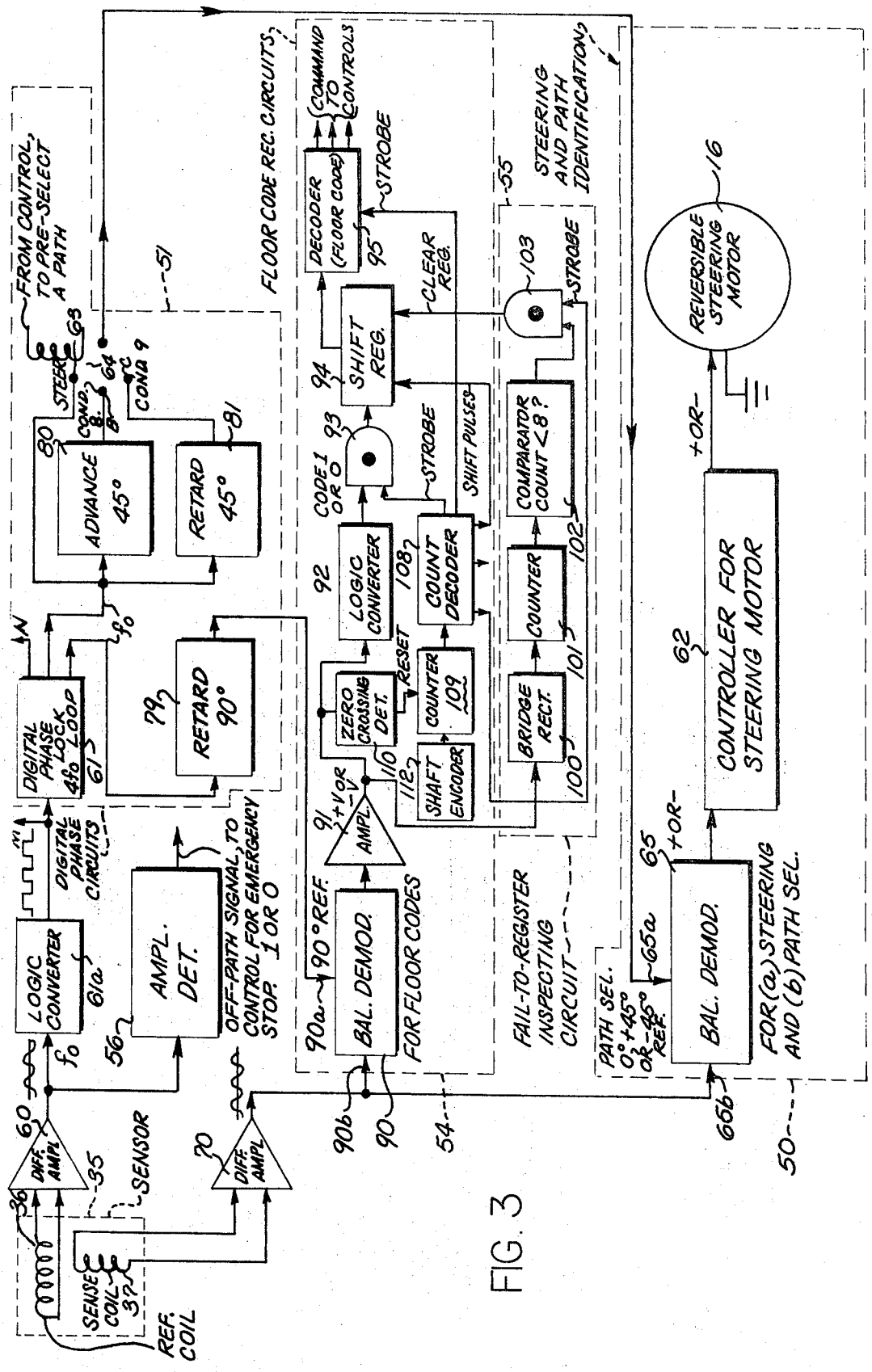
FIG. 3 is a block diagram of portions of the electronic circuits on board the vehicle.

The present invention provides an improved vehicle guidance system of the type in which a vehicle follows conductors defining a guidepath. The improved system is such that a sensor which senses deviation of the vehicle from the guidepath also serves to detect code patterns based on configurations of conductors embedded in the floor over which the vehicle passes, and serves thirdly to receive modulated signals transmitted to the vehicle from a stationary central processor. The vehicle can be commanded to stop, start, change its speed, follow a particular branch at a fork in the route, blow the horn, etc. without the aid of a human operator.

GENERAL SYSTEM

The general system comprises motorized vehicles and a central stationary processing unit which assists in controlling the vehicles and which supplies electrical current to electrically insulated guide conductors 8, 9 installed in the floor where the vehicles are to travel. A typical vehicle 10 to be controlled is shown in FIG. 1. The vehicle 10 has a rechargeable storage battery 11 for powering it. The vehicle also has trailing wheels 12 and at least one front wheel 13. A traction motor 14 which is driven by the battery 11 is mechanically connected to the front wheel 13 to drive it and thereby power the vehicle. A steering motor 16 is provided which is connected by means of a steering chain 18 to a support mechanism for the front wheels so that as the support mechanism turns the vehicle is steered. The detailed construction of the vehicle 10 is not important to the present invention and it should be understood that the vehicle may be of any suitable construction.

Various devices are mounted on board the vehicle 10 for manually controlling the traction motor 14, the steering motor 16, and other equipment. These devices include a manual control stick 24, a manual control panel 21 and a vehicle control unit 22 which contains high power switches required for controlling the motors. The vehicle also has equipment for automatic control of its operation and which can be preset. These items include a program control panel 20 into which commands can be preset by means of switches (not shown) and a program control unit 26 which contains electronic memory devices and logic circuit equipment for controlling the vehicle. An incremental shaft encoder 30 is geared to the drive shaft of the traction motor 14. The shaft encoder 30 serves as an odometer for measuring distance travelled by the vehicle 10 and for presenting that data in digital electrical form to the program control unit 26.

Mounted at the front of the vehicle and close to the floor is a sensor unit 35 which detects alternating magnetic fields that pass through it due to currents flowing in guide conductors 8, 9 embedded in the floor. The sensor unit 35 includes a pair of coils, namely, a reference coil 36 and a sensor coil 37. The reference coil 36 is mounted so that its longitudinal axis of symmetry is horizontal and is transverse to the direction of travel of the vehicle. The reference coil 36 is therefore sensitive only to horizontal components of magnetic induction field created by current flow in conductors 8, 9 and which are generally perpendicular to the route of travel. The sensor coil 37 is mounted with its principal axis vertical, and therefore is sensitive only to vertical components of the alternating magnetic field caused by currents in the guide conductors 8, 9. The particular angular arrangement of the coils 36, 37 could be varied with appropriate changes in the circuitry to be described. The signals that are induced in each of the coils 37, 36 are directed to electronic circuits, to be described, where the signals are processed to control the vehicle 10.

The separate guide wire conductors 8, 9 are located slightly below the surface of the floor so as to define routes or paths over which it may be desired to have the vehicle travel. The wire conductors could obviously be otherwise located. FIG. 2A shows an illustrative layout of the guide conductors 8, 9 in plan view. One guide conductor 8 is shown by a dotted line in FIG. 2A and executes a generally figure-of-eight shaped configuration on the layout. The other guide conductor 9 (full lines) describes a similar pattern except that it is a mirror image of the path defined by wire 8. Each wire 8, 9 is a complete circuit and forms a complete electrical loop. A pluarlity of code pattern emplacements 40 are installed in the floor at eight locations in the illustrated plan of FIG. 2A. Each code pattern comprises a series of lobes or nodes 41 which are defined by deviations of carefully controlled shape in the paths of the guide wires 8, 9 and placed so that their locations and their patterns can be detected by the sensor unit 35 on the vehicle 10 as it passes over them. These code patterns will be described in greater detail hereinbelow.

FIG. 2 shows the main elements of a circuit for applying AC power to the two guide conductors 8, 9 in the floor. In the preferred embodiment, AC power, 9.6 kilohertz frequency, is output by a signal generator 45. The sine wave output of the generator 45 is phase modulated by modulator 46 in accordance with modulating data representing a message produced by the central processor 7. The output of the phase modulator 46 is connected (through a current-amplitude regulator not shown) to line 8 in the floor. An amplitude-controlled current which is phase-modulated is therefore driven through guide conductor 8. The output of the phase modulator 46 is also connected (through a regulator not shown) to a 90-degree phase shifter 47 and from there to conductor 9. Guide wire 9 therefore has a phase-modulated current which is always lagging the phase of the current in guide wire 8 by 90°. Alternating magnetic induction fields encircle the guide wires 8, 9 because of the alternating currents which flow in them. These fields induce voltages in the coils 36, 37 of the sensor unit 35 when the coils 36, 37 are located in the alternating magnetic fields.

The voltage signals induced in the sensor coils 36, 37 are operated upon by electronic circuits shown in FIG. 3 to perform various functions. One subcircuit 50 of FIG. 3 utilizes the received signals to steer the vehicle, in a manner to be described below. Another subcircuit 51 is sued with subcircuit 50 for path identification, where two guide wires which have been running together in the floor diverge into two separate paths, one of which must be selected as the one to be followed. Subcircuit 50 is sensitive to the selected guide wire and not to the unselected one, as will be described below.

Subcircuit 54 contains receiving circuits for detecting and decoding the code patterns 40 in the floor. Subcircuit 55 is a safety circuit associated with the floor code receiving subcircuit which reduces the probability of the floor code receiving subcircuit responding to faulty signals.

An off-path detector 56 is provided to stop the vehicle when the strength of the received magnetic signal is so low as to indicate that the vehicle is off the guide-path altogether.

Another code receiving circuit 58 which utilizes signals developed at points M and N of FIG. 3 is shown in block form in FIG. 9. This equipment demodulates the phase-modulated carrier signals transmitted to the vehicle from the central processor 7 by way of the guide conductors 8, 9 and the sensor unit 35. The phase modulation is recovered and the information is utilized by the vehicle for control.

The structural details and operation of the circuit will be described in connection with the description below of the various principal functions performed by the circuit. The principal functions are steering of the vehicle, path selection, reception of codes from code patterns in the floor, and reception of encoded messages from phase modulation of the carrier currents flowing in the guide conductors 8, 9.

STEERING

Figure 4:
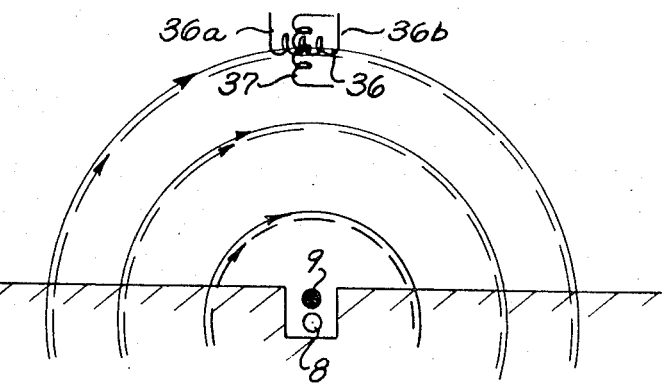
FIG. 4 is a schematic cross-sectional view showing two guidepath conductors, with the sensor coils of the vehicle in the magnetic field created by the guide wires and located directly above the guide wires.

The vehicle steers itself automatically along a guide wire path by sensing when it has deviated slightly in either direction from the center of the path and controls the steering motor 16 to turn the wheel 13 in the proper direction to bring the sensor back to the center of the path. During a portion of vehicle travel, the vehicle 10 travels on a portion of its route at which the two guide wires 8, 9 are present in an overlying relationship. FIG. 4 shows this situation in cross-sectional view, where the two guide wires 8, 9 are located in a recess in the floor. Each wire carries alternating current of typically audio frequency. The fact that the wires 8 and 9 carry currents that differ in phase by 90° is of no consequence in the steering process about to be described. The two guide wire currents create magnetic fields which combine to produce a single resultant alternating magnetic field, which is generally circular around the two wires, as shown schematically in FIG. 4. As the current alternates in the guide wires 8, 9, the direction of the magnetic flux which is enclosed by the turns of the reference coil 36 reverses alternately, so as to induce a voltage across the output wires 36a, 36b of the reference coil 36.

No voltage is induced in the sense coil 37 which is the coil whose axis is vertical, because the magnetic field at the sensor has no vertical component when the vehicle is directly over the guidepath. Consequently, there is no time-rate-of change of the flux encircled by the turns of the vertical coil 37 and no voltage is induced in the vertical coil 37 under such a condition.

The voltage signal induced in the reference coil 36 is amplified in a differential amplifier 60. A differential type of amplifier 60 is employed so that spurious signals, such as noise induced in the two lead wires 36a, 36b from the reference coil 36, will at least partially cancel and will not appear at the output of the differential amplifier 60. The desired signal appears as a sine wave at the output of the differential amplifier 60 and is connected to a logic converter 61a which changes it to a square wave of the same frequency. The output of the logic converter 61a is connected to the synchronizing input terminals of a digital phase lock loop 61. The digital phase lock loop 61 tracks the phase of the received signal with a locally generated square wave signal whose frequency is four times that of the received signal. The output of the phase lock loop is a strong clean replication of the received reference signal, as to its phase. The primary purpose of the reference coil 36 is to provide phase information, not amplitude information, to circuits in the vehicle 10.

The output of the phase lock loop 61 passes through a conductor to one terminal 63 of a selector switch 64 which is presumed, for the moment, to be positioned to the "steer" position, which is such that the terminal 63 is connected through the switch 64 to other circuit components. The switch 64 preferably comprises static switching components and is indicated symbolically at FIG. 3 by the mechanical switch 64. A square wave output from the switch 64 connects to the reference input terminal 65a of a balanced demodulator 65 in the steering and path identification subcircuits 50 of FIG. 3. This square wave and the others which are output from the digital phase lock loop 61 to phase shifters are of the original received guide wire frequency and not the quadruple primary frequency of the loop. The phase lock loop circuits, being digital, can conveniently output integral submultiples of its quadruple primary frequency.

The balanced demodulator 65 has a second input 65b for receiving a signal induced in the sense coil 37 of the sensor. In the present example, FIG. 4, the sense coil 37 is receiving no signal whatsoever because the sensor is traveling directly over the guide wires and zero voltage is induced in the sense coil 37. The output of the sense coil 37 is connected to a differential amplifier 70 which, of course, has zero output under the conditions just described, so the input signal to the balanced demodulator 65 from coil 37 is zero. The output of a balanced demodulator 65 of the type employed is always zero when the input signal from the sensor coil 37 is zero. Consequently, the balanced demodulator 65 provides a zero signal to a motor controller 62 to which it is connected. The zero output of the steering motor controller circuit 62 is applied to the reversible steering motor 16. The reversible steering motor 16 therefore receives zero error signal and, accordingly, is not energized so that the front wheels remain in position so long as the sensor remains directly over the guide wires.

Figure 4A:
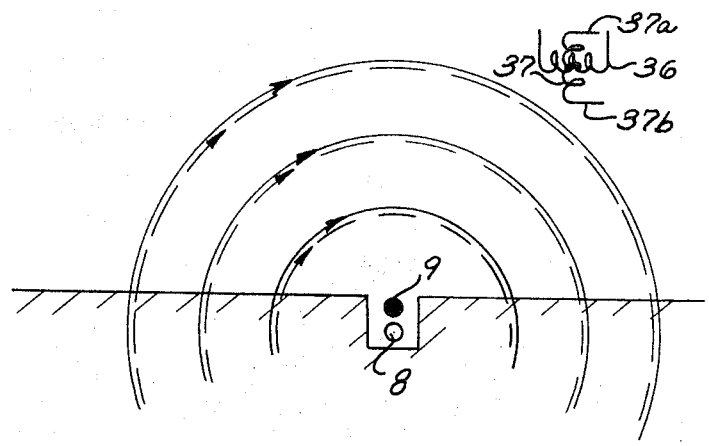
FIG. 4A is a cross-sectional view, similar to FIG. 4, with the sensor coils off-center of the guidepath to the right, representing an incorrect position of the vehicle.

When the sensor strays from the guidepath, as shown in FIG. 4A, for example, a correction signal is applied to the reversible steering motor 16 in the following way. The horizontal reference coil 36 of FIG. 4A continues to receive a relatively strong signal, which is induced in it by the horizontal component of the magnetic field at the new location of the sensor unit 35 on the right side of the guide path. The magnetic field at the sensor assembly 35 has a vertical component also, but the horizontal reference coil 36 is not responsive to vertical components of the magnetic field because the lines of flux of the vertical component are not enclosed by any loops of the reference coil 36. The voltage signal induced in the reference coil 36 is processed by the circuits of FIG. 3 in the same manner as was described above for the case in which the vehicle was directly over the guide path. In brief, the voltage from the reference coil 36 is amplified in a differential amplifier 60, converted to a square wave by logic converter 61, and is employed to synchronize a digital phase lock loop 61 operating at a frequency two octaves above the reference signal. The output square wave from that loop is connected through the steering position terminal 63 of switch 64 to the reference input terminal of balanced demodulator 65, to serve as a phase reference signal for the demodulator 65. When the sensor unit 35 is on the right side of the guide wires 8, 9, as in FIG. 4A, the vertically mounted sense coil 37 is subjected to a vertical component of the magnetic field. When, for example, the instantaneous resultant magnetic field is in a clockwise direction, as shown in FIG. 4A, the vertical component of the magnetic field at the sense coil 37 is in a downward direction. One-half cycle later the direction of the magnetic field is reversed and the vertical component looping the turns of the sense coil is in an upward direction. These rapid alternations of magnetic field in the sense coil 37 induce a voltage at its output wires 37a, 37b which are connected to the differential amplifier 70 of FIG. 3. The vertical, horizontal and resultant magnetic fields at the sensor assembly have identical time phase in the situations of FIG. 4, 4A. Consequently, the AC signal at input terminal 65b of the balanced demodulator 65 connected with sense coil 37 is in phase with the phase reference signal at the terminal 65a of the demodulator 65 connected with the reference coil 36. When the input signal to the balanced demodulator 65, of this conventional type, is in phase with the phase reference signal, the output of the balanced demodulator 65 is a DC voltage that is proportional to the amplitude of the input signal at terminal 65b connected to the sense coil. The magnitude of the reference signal is so great in the present circuit that its magnitude has no effect on the output signal from the balanced demodulator 65; only the phase of the reference signal is of any consequence. The output voltage from the balanced demodulator 65 is an error signal whose magnitude depends upon the amount by which the sensor unit 35 is displaced laterally from the guidepath, and whose sign depends upon the direction, right or left, of the sensor unit 35 off the guidepath. In the present situation a positive DC error signal is produced by the demodulator 65 due to the rightward deviation of the vehicle from the guidepath. The error signal is applied to the input of the controller 62 for the steering motor 16, which also has manual control provisions, not shown. The steering motor controller 62 amplifies the error signal and applies it to the reversible steering motor 16. The steering motor 16 turns and drives the chain which turns the front wheels of the vehicle toward the left. This is the proper direction to steer the vehicle back to the center of the guidepath. As the vehicle returns toward the center of the guidepath, the strength of the error signal induced in the sense coil 37 diminishes because the vertical component of magnetic field induction diminishes gradually to zero as the sense coil 37 moves to a position vertically over the guide wires. When the error signal is zero, the reversible steering motor 16 stops.

Figure 4B:
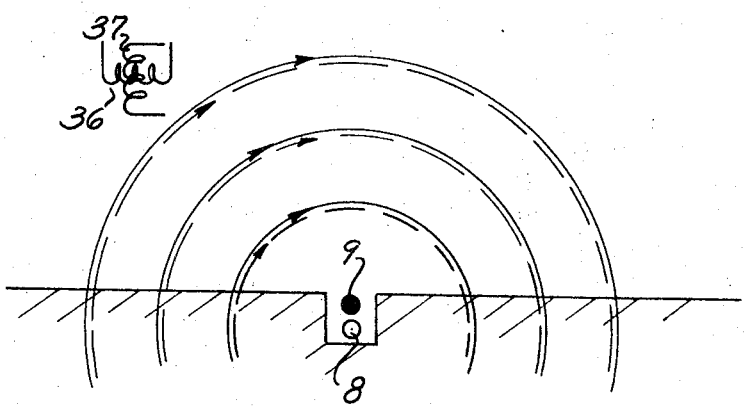
FIG. 4B is the same as FIG. 4A except that the vehicle is off the center of the guidepath to the left.

When the vehicle deviates to the left of the guidepath, as shown in FIG. 4B, an error signal of opposite polarity from that corresponding to a rightward deviation is produced, and the reversible steering motor 16 brings the vehicle back to the center of the guidepath by steering it to the right. When the vehicle is offset to the left, as in FIG. 4B, the phase of the horizontal component of magnetic field which induces the voltage in the reference coil 36 is no different than it was in FIGS. 4 and 4A. The phase of the voltage induced in the sense coil 37, however, is reversed from that of the signal in the reference coil. This may be seen by noting that when the magnetic field is instantaneously in a clockwise direction, as shown in FIG. 4B, the horizontal component to which the reference coil 36 is responsive is in a righward direction, but the vertical component of magnetic induction to which the sense coil 37 is responsive is now upward instead of downward. The voltage applied by the sense coil 37 to its differential amplifier 70 is 180 degrees out of phase with the voltage applied by the reference coil 36 to its differential amplifier 60. The reference coil signal is processed in the same way as was described above so as to produce a zero degree phase reference at the reference input terminal 65a of the balanced demodulator 65. The output of the differential amplifier 70 is applied to the input terminal 65b of the balanced demodulator 65 with a phase 180° different from that of the phase reference signal on terminal 65a. Consequently, the output voltage from the balanced demodulator is negative and has a magnitude which is dependent, as before, upon the horizontal displacement of the sensor unit 35 from an imaginary vertical plane passing through the guide wires. This negative signal is amplified by the steering motor control circuits 62 and applied to the reversible steering motor 16 so that it steers the vehicle toward the right and brings it again directly over the guide wires.

PATH SELECTION

The vehicle can be programmed to follow either wire at places in the route where the two guide wires separate and go different directions. For example, if the vehicle were proceeding rightward on a two-wire path position of FIG. 2A, it could be commanded or programmed in advance to select the dotted path (wire 8) when it arrives at a fork where the guide conductors diverge. The vehicle sensing system, upon accepting the path selection command, becomes insensitive to magnetic fields created by, e.g., the wire 9 of FIG. 2A, and responsive only to those created by the wire 8. This selective sensitivity is accomplished by temporarily making the steering circuit on board the vehicle responsive only to the phase of the signal that is being produced by the conductor 8 and nonresponsive to the phase of the magnetic field produced by the guide wire 9.

The details of the technique that is employed to make the path selection follow. As the vehicle proceeds along a path portion having two wires, a command is given to the vehicle either by means of the on-board program or by a command signal issued by the central processor 7 through its phase modulator 46 to follow either conductor 8 or conductor 9. In the present embodiment, when the vehicle passes over a floor code immediately before the place where paths diverge, the command or program is put into effect. The selection command causes switch 64 of FIG. 3 to go to position B if conductor 8 were selected, and to position C if conductor 9 were selected. In the present example, the path defined by conductor 8 is selected. When the switch 64 is moved to position B, the phase of the signal received by the reference coil 36 is advanced by 45 degrees by means of a phase shift circuit 80 before the signal is applied to terminal 65a of the balanced demodulator 65. At this time, the vehicle has passed the floor code but has not yet arrived at the point where the two guide paths diverge.

Figure 5:
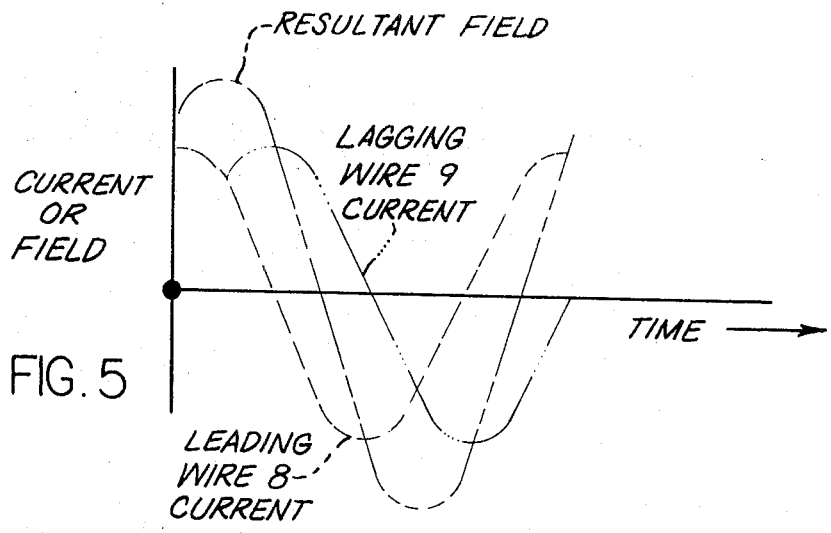
FIG. 5 is a graph of the current in each of the two guide conductors as a function of time.

FIG. 5 shows as a dotted line a graph of the current in conductor 8 as a function of time. The solid line of FIG. 5 is a graph of the current flowing in conductor 9 as a function of time. The current in conductor 9 lags the current in conductor 8 by 90°. The currents in the two guide wires are of approximately equal magnitudes so that the resultant magnetic field produced by them at a point equidistance from the two wires has an effective phase shown in FIG. 5 as a double-dotted line labelled resultant field. The resultant or effective field lags the current in guide wire 8 by 45° when the guide wires are close together. When switch 64 is moved to the position B, the reference coil 36 and its digital phase lock loop 61 continue to track the resultant field, but the balanced demodulator 65 in the steering subcircuits 50 receives a reference signal having the phase of conductor 8, which leads the resultant field by 45°. The balanced demodulator 65 therefore has a phase reference signal which is in phase with the component of signal in sense coil 37 produced by guide wire 8 and is 90° out of phase with the component of signal which is produced in the sense coil 37 by guide wire 9.

The balanced demodulator 65 produces output voltage only in response to components of signal which are either in phase with its reference input signal or else 180° out of phase with it. It produces no DC output signal whatsoever from the component of signal from the sense coil 37 which is 90° out of phase with the reference signal from coil 36, or which is 270° out of phase with that reference signal. The demodulators, as is conventional, include low-pass output filters.

Consequently, the steering subcircuit 50 has been forced to track only the component of the signal produced by guide wire 8 and to be entirely insensitive to the presence of the guide wire 9. This has occurred before the vehicle and its sensor arrive at the divergence point of the two conductors.

When the vehicle arrives at the divergence point, it steers along guide wire 8. This occurs generally in the manner described above in connection with steering. If the vehicle moves to one side of the conductor 8, a phase signal is produced in sense coil 37 which is in phase with reference signal input at terminal 65a of balanced demodulator 65. A positive error signal is then produced by demodulator 65 at the output. If the vehicle moves to the other side of the conductor 8, a phase signal is produced in sense coil 37 which is 180° out of phase with the reference signal at terminal 65a, as altered by phase shift circuit 80. Demodulator 65 then produces a negative DC error signal at its output. The sign of the error signal at the output terminal of demodulator 65 determines the direction in which the reversible steering motor turns, and consequently the direction toward which the steering wheels are turned. The vehicle is turned in a direction to bring it back to the center of the conductor 8, so that it follows conductor 8.

As the paths diverge the resultant field becomes progressively more in phase with the current produced by guide wire 8 because the vehicle has remained close to wire 8 but has moved progressively farther away from guide wire 9. The phase lock loop tracks this progressive change of phase of the resultant field and after a time it is responding only to the magnetic field from conductor 8, just as does the sense coil 37, because wire 9 is now far away from the sensor unit 35. The vehicle has locked on guide path 8 and has properly performed its command to choose that path at the fork in the road. The path selection information was conveyed to the vehicle either by a preset on-board program or by command from the control processor. Actuation of the switch 64 to its preselected position was effected by receipt of a floor code pattern by the vehicle. The switch 64 must be returned to its normal "steer" position before the vehicle is called upon again to select a path. The switch is returned by a distance measuring circuit based on the output of a shaft encoder 112, a counter 109, a count decoder 108, and a control circuit, one of whose outputs moves the switch 64 back to the steer position after the vehicle has travelled a fixed distance along the guidepath beyond the location of the code pattern which immediately preceded the place of path divergence.

If instead the vehicle is commanded to follow the conductor 9, the selection command causes switch 64 of FIG. 3 to go to position C. The output of phase lock loop 61 is then retarded by 45° in phase shift circuit 81, and applied to terminal 65a of demodulator 65. Demodulator 65 is then very sensitive to the particular components of signal from sense coil 37 which are lagging the resultant effective field by 45 degrees. The component created by wire 9 is lagging the resultant effective field by 45 degrees, and hence the demodulator is very responsive to it. Contrarily, the component of signal from sense coil 37 which was induced by wire 8 is 90° out of phase with the altered reference signal at terminal 65a of the demodulator 65, so the demodulator ignores that component. The vehicle therefore follows wire 9, as was intended.

FLOOR CODES

As noted above, guidepath wires 8, 9 may be configured in the floor in code patterns to which sensing circuits on the vehicle are responsive. When the vehicle passes over such a code pattern, the vehicle can recognize the pattern and determine thereby the vehicle's instantaneous position along the guide path. The unique pattern of each code emplacement 40 can be interpreted as particular commands by circuits on the vehicle to control the vehicle and its accessories. Many different controls may be effected; for example, when the vehicle arrives at a particular code in the floor, it automatically blows its horn twice and reduces its speed. This may be desirable at a place on the route where the visibility ahead is very limited.

Figure 6:
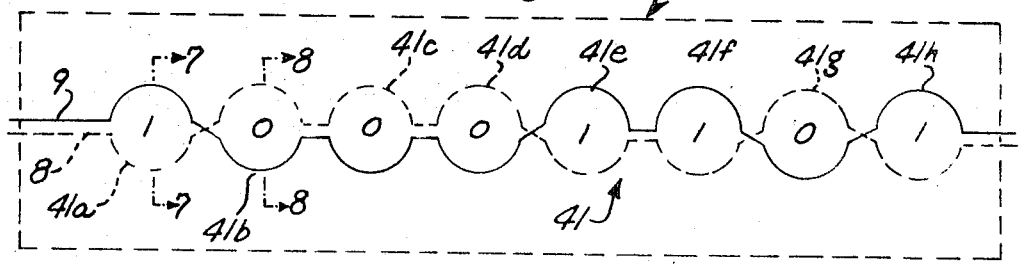
FIG. 6 is a plan view of a layout of conductors in a code pattern.

Details of the layout of the guidepath wires 8, 9 within a code emplacement 40 are shown in FIG. 6. The guide wires 8, 9 are formed in half-circular loops in circular channels that have been cut in the floor. The half-circular loops define a circular lobe or node 41. In the present embodiment, the diameter of the circles preferably is approximately 3 inches and their centers are preferably 4 inches apart. As will be apparent, the particular shape of the floor code lobes can be varied as can the particular size and spacing thereof.

As the vehicle traverses the lobes 41, the sensor unit 35 senses the magnetic fields thereof. The magnetic field of a given lobe 41 has a phase characteristic which depends on which conductor 8 or 9 is on the right side of the lobe, as will be described hereinbelow. Assuming that the vehicle is moving from left to right across the code emplacement 40 of FIG. 6, the vehicle will first encounter lobe 41a, and then progressively encounter lobes 41b to 41h (8 lobes in all). The lobe 41a is defined by the solid line, conductor 9, on the vehicle's left side and as far as 1½ inches off the center of the guidepath, and conductor 8 on the vehicle's right side. Between the first and second lobes 41a, 41b, the guide wires 8, 9 cross each other, so that wire 8 is on the left and the wire 9 on the right of the second lobe 41b. At the third and fourth lobes, the guide wire 8 remains on the left side of the vehicle and the solid wire 9 remains on the right, and so forth.

Every lobe at which the wire 9 is on the left side of the vehicle 10 is decoded by receiving circuits in the vehicle as a binary 1 signal; any lobe at which the guide wire 9 is on the right side of the vehicle is decoded as a binary zero, in a manner to be described.

Figure 7A:
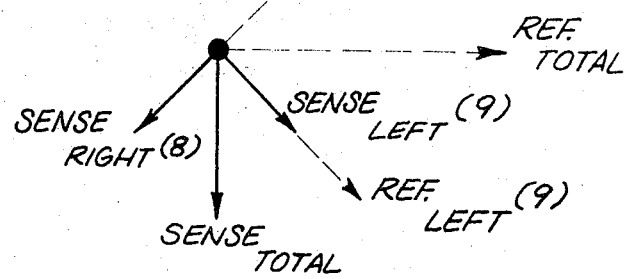
FIG. 7A is a phasor diagram illustrating the operation of the vehicle sensor unit when located in the magnetic field of the code of FIG. 7.
Figure 7:
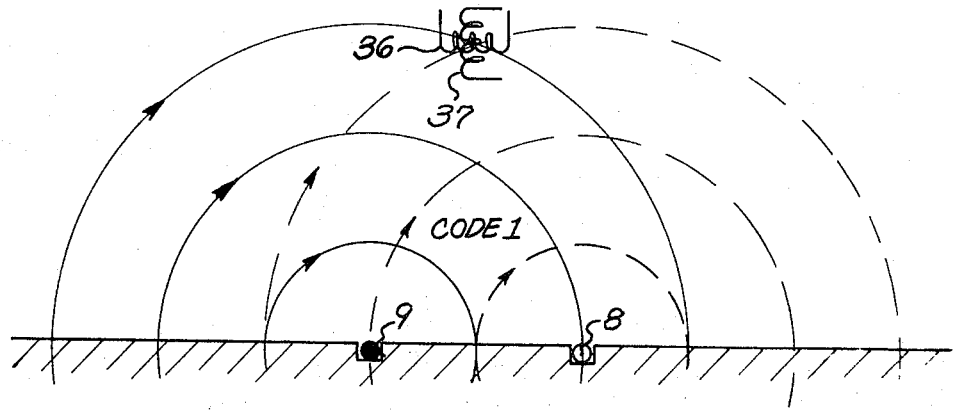
FIG. 7 is a cross-sectional view of the guide conductors at one of the code pattern locations shown on FIG. 6, as indicated by line 7—7 of FIG. 6.

As the vehicle passes over the first lobe 41a, the sensor unit 35 remains essentially over the center of the guidepath, as shown in FIG. 7. In FIG. 7 conductor 9 is shown recessed in the floor to the left of the center line of the guidepath and is represented by a solid circle to show the cross section of the conductor. The conductor 8 is shown as being to the right of the center line and is represented by a hollow circle. The magnetic lines of induction produced by the conductor 9 are shown by solid circles. Their horizontal component combines with the horizontal component of magnetic field induced by the conductor 8 whose field circles are represented by dahsed lines, and the resultant horizontal flux in the reference coil 36 induces an AC voltage in the reference coil 36 similar to that shown in FIG. 5 as the resultant field. Accordingly, the voltage induced in the reference coil 36 lags the current in the guide wire 8 by 45° and leads the current of the wire 9 by 45° as shown in FIG. 5.

The phase relationship between components of induced voltages in the situation of FIG. 7 are shown on a phasor diagram in FIG. 7A. The voltage induced in the reference coil 36 by the left-hand guide wire 9 is labelled "ref. left" and the voltage induced therein by the right-hand guide wire 8 is designated "ref right." These voltages are drawn 90° apart representing the 90° phase difference between currents carried by conductors 8, 9. The total induced voltage in the reference coil is labeled "ref total."

The left-hand guide wire 9 produces a vertical component of magnetic field at the sense coil 37 which is in time phase with the ref. left phasor, just described, but is somewhat smaller. This component is labeled "sense left," and because it is in phase with the ref. left phasor is shown in 7A at the same phase. The vertical component of magnetic field created by the right-hand guide wire 8 of FIG. 7 similarly induces a voltage in the vertical sense coil 37 but since its direction is upward, instead of downward as was the left-hand component, it is contrary to the arbitrarily assumed positive sense of flux for inducing positive voltage in the sense coil 37, and therefore has a negative sign. The voltage induced in the sense coil 37 due to the right-hand guide wire 8 is therefore drawn 180° out of phase with the phasor (ref. right) and is labeled sense right. The fact that the right-hand guide wire 8 induces a signal in the sense coil 37 that is out of phase with that which the same wire induces in the reference coil 36, while the left-hand guide wire 9 induces a voltage in the sense coil 37 whose phase equals that of the reference left phasor induced in the reference coil 36 by wire 9 is a consequence of the geometry of the situation, as shown in FIG. 7.

The sense left phasor and the sense right phasor of FIG. 7A are combined to produce a sense total phasor which represents the total voltage induced in the sense coil 37 in the situation of FIG. 7. The sense total phasor is seen to lag the reference total phasor by 90°. The fact that it lags and does not lead is utilized by the decoding circuits on the vehicle to ascertain whether the lobe 41a is a binary 1 or a binary zero.

The sense total phasor voltage which is shown in FIG. 7A is amplified in the differential amplifier 70 of FIG. 3 and applied to input terminal 90a of balanced demodulator 90. The phase reference input to the balanced demodulator 90 is derived by phase-shifting the reference coil signal. The digital phase lock loop 61 is locked to the signal from the reference coil 36 whose phase is shown as "ref. total" on FIG. 7A. The 90° phase-retarding circuit 79, which receives the signals from the digital phase lock loop 61, shifts this phase to produce a phase reference signal at input 90a of balanced demodulator 90. That phase reference signal at input 90a is in phase with the sense total phasor of FIG. 7A (because it was produced by rotating the reference total phasor 90° clockwise). The balanced demodulator 90 will consequently produce a position DC output voltage at its output terminal when the vehicle is passing over the first lobe 41b of FIG. 6. The positive signal from demodulator 90 is amplified by amplifier 91 and applied to a logic converter 92 which standardizes the signal to a code −1. The code −1 signal is one input of an AND gate whose other input provides a strobe (timing) enable signal when the vehicle sensor is over the first lobe 41a of the code pattern. The one data bit which is output by the AND circuit 93 is entered into a data register 94.

Figure 8A:
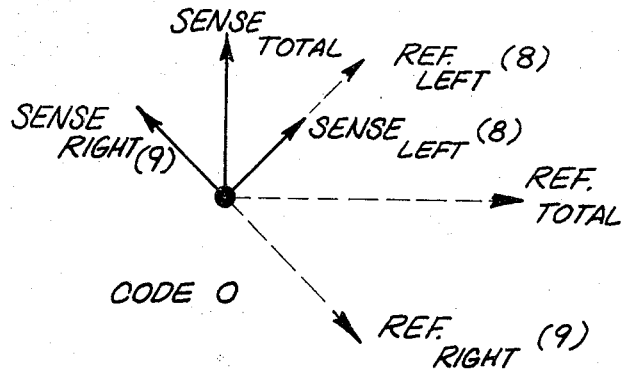
FIG. 8A is a phasor diagram depicting the operation of the vehicle servo unit when located in the magnetic field illustrated in FIG. 8.
Figure 8:
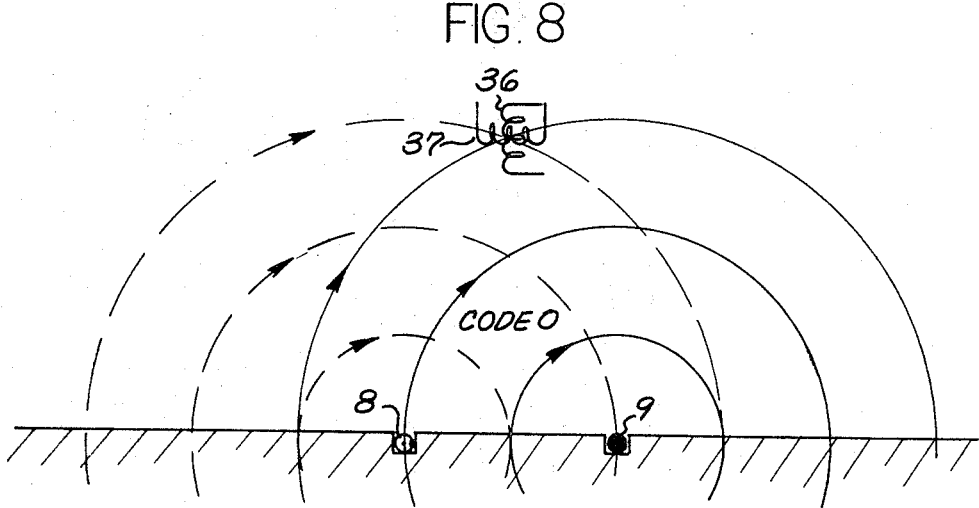
FIG. 8 is a cross-sectional view of the guide conductors, as indicated by line 8—8 of FIG. 6.

As the vehicle continues to travel, it comes to the center of the second lobe 41b where the geometrical situation is as shown in cross section in FIG. 8. Here the current of the leading phase is in the left-hand guide wire 8. It will be shown that a logic zero is now decoded by the floor code receiving circuits. The horizontal components of magnetic field in the reference coil 36 due to the two guide wires 8, 9 are additive as before. Their output is processed by the reference circuits as before and retarded by 90° to serve as a reference phasor for the balanced demodulator 90.

The vertical components of magnetic field for the situation of FIG. 8 are shown in the phasor diagram of FIG. 8A. The reference left phasor represents the voltage induced in the reference coil 36 by a magnetic field due to current in the left-hand guide wire 8. The reference right phasor is for the right-hand guide wire 9, and the reference total phasor represents the total voltage induced in the reference coil 36. The phasors representing the induced voltages in the coil 36 from conductors 8 and 9 are indicated at 90° apart representing the 90° phase difference in the currents carried by the conductors.

The sense coil 37 has one component of voltage induced in it by current in the left-hand guide wire, and it is in phase with the reference left phasor of FIG. 8A. The vertical component of magnetic field in the sense coil 37 due to current in the right-hand guide wire induces a voltage in the sense coil whose phase is 180° different from the voltage induced in the reference coil 36 by the right-hand guide wire, (as was true with the previous FIG. 7a). This phase reversal arises because the vertical component of magnetic field in the sense coil due to the right-hand guide wire is upward and therefore contrary instantaneously to the arbitrarily assumed positive direction of magnetic field in the sense coil. The resultant induced voltage in the sense coil 37 is the "sense total" phasor of FIG. 8A, which leads the reference total phasor by 90°.

The reference coil signal is acted upon by the 90° retard circtui 79 and accordingly the signal communicated to terminal 90a of demodulator 90 is 180° retarded relative to the sense coil signal delivered to terminal 90b. The demodulator under such circumstances provides an output that is maximum negative.

The demodulator output is amplified by amplifier 91 and applied to logic converter 92 which converts the negative signal to a binary code zero. The binary code zero signal enters one input of the AND gate 93, (and is strobed into the date register 94 by a pulse occurring at the other input of the AND gate 93,) this being the second digit which has entered the data register. The first digit is shifted one place to the right in the data register 94, as is common, so that the contents of the data register, reading from left to right, are 01000000.

In this way, codes are detected from the floor and entered into the data register where they are analyzed by a group of decoding circuits represented by decoder 95. Each of the individual decoder circuits in decoder 95 recognizes its own unique code when it appears in the data register 94 and responds by issuing an appropriate command at the output terminal of the decoder circuits. The command is transmitted to the controls to perform some function on the vehicle. The contents of the shift register 94 are not examined until the entire code pattern has been received and stored in it.

Shortly after the entire code has been recieved and before the decoder acts, the data are examined by a safety circuit and discarded if an unexpected number of bits were received. This is accomplished by the fail-to-register inspecting circuit 55 of FIG. 3. Each output signal from amplifier 91 corresponds to one lobe of the code pattern received from the floor. Those signals are rectified in a bridge rectifier 100 so that each bit produces a pulse at the output of the bridge rectifier 100, irrespective of the sign of the signal at the output of amplifier 91. The pulses from the bridge rectifier 100 are counted by a counter 101 and input to an 8-comparator 102 to ascertain whether all eight pulses which should have been received were received. The output of the comparator 102 is connected to an AND gate 103 which is enabled by means of a second input to that AND gate 103 after the vehicle has travelled a predetermined distance beyond the crossover point between lobes 1 and 2.

Strobe signals are provided by count decoder 108 and counter 109 which is reset to zero by the occurrence of a phase crossover between a code 1 which is always the code of the first lobe, and a code zero which is always the code of the second lobe in a code emplacement. A conventional zero crossover detector 110, which operates upon the output signal of amplifier 91, detects when a positive signal +V has crossed over zero voltage toward a negative signal −V, and this resets the counter 109. The counter 109 is thereafter incremented by pulses from the shaft encoder 112. The counter's contents are decoded to provide strobe pulses for each of the lobes of the code pattern and to provide other required timing signals.

The output of AND gate 103 operates to clear the data register 94 if, after all of the code bits should have been received, the comparator 102 finds that fewer than eight bits have actually been received. If the data register 94 is cleared, no commands are issued from the decoder 95.

The docoder 95 is strobed a short time after the fail-to-register inspection circuit has had an opportunity to clear or not to clear the data register. After sufficient distance has been traversed that the code has been entirely processed, as indicated by the status of the shaft encoder counter circuits, the floor code receiving circuits are reset by the count decoder 108 so as to be receptive to the next floor code which the vehicle will encounter. The foregoing description shows how code patterns wired in the floor are received and decoded by circuits in the vehicle so as to produce a variety of command signals for the control circuits of the vehicle.

CENTRAL PROCESSOR CODES

The central processor encodes commands by phase-modulation of the AC currents in the guide wires. FIG. 2 shows how the modulating data from central processor 7 phase-modulates the AC power before it is applied to the guide wires 8 and 9. The central processor modulates by making instantaneous 180° phase reversals of the guide wire currents periodically, e.g., every ten cycles. Data consists of irregularities (skips) in this otherwise regular sequence of phase reversals, which are 180° reversals. The phase modulation is applied alike to both conductors 8, 9 so that their relative phase difference of 90 degrees is unaffected by the modulation. The reference coil 36 receives the phase-modulated signals and locks the digital phase lock loop 61 to them, as described above. One output M, from the logic converter 61a of FIG. 3, and one output N of the digital phase lock loop 61 are shown also as lines M and N on FIG. 9. FIG. 9 is one embodiment of circuits for decoding the phase-modulated signals transmitted by the central processor 7.

The output M of the logic converter 61a is phase-demodulated using an output N of the digital phase lock loop 61 as a phase reference in circuit 120. The digital phase lock loop 61, which operates with four times the frequency of the guide wire currents, does not follow the phase modulation imposed by the central processor. Demodulation is accomplshed in phase demodulator 120 by examining the phase of the signal at line M at successive uniformly spaced times that are strobed under the control of line N. Each received bit of encoded data from line M is temporarily stored when received, and the succeeding bit is compared with it to ascertain whether or not a phase reversal has occurred. Conventional logic circuit components are employed to make the comparison, which is performed on each bit against its predecessor. When an expected routine phase reversal has not occurred, a modulation data bit is recognized by circuit 120, and is output to register 121. The complete final output of the data register 121 is decoded by a group of decoders 122, each of which is sensitive to only one particular code pattern in the data register 121. Each of the decoder circuits has an output line connected to the control circuits 22, 26 for providing digital data to the vehicle. The particular decoder 122 whose code word is present in the data register 121 at the end of the transmission of the message, puts out a command signal to the control circuits.

The contents of the data register 121 are examined before the decoders act, to detect errors in the messages. Only certain codes, within the permissible code format, are legitimate messages; all others are recognizable from their code format as having been erroneously received. When a defective message is received, the code format inspection circuit 130 outputs a logic 1 signal to the control circuit to put the vehicle in emergency mode. This is a safety circuit which alerts the vehicle to the fact that the central processor 7 has attempted to send a message to the vehicle, but that the message was aborted.

SUMMARY

The steering and path sensing circuits are sensitive to deviations of the vehicle from the center line of the guidepath, but are not significantly sensitive to code patterns wired in the floor. The floor code receiving circuits, on the other hand, are very sensitive to code patterns wired in the floor, but do not respond to small departures of the vehicle from the center line of the guidepath because the 90° phase reference of balanced demodulator 90 makes this demodulator produce zero output when its input signal at terminal 90b is directly in phase or 180° out of phase with the signal induced in the reference coil.

The steering and path sensing circuits and the floor code receiving circuits are both immune to any phase modulation which is imposed alike on both guide wire currents. Consequently, the circuits provided for decoding signals from the central processor are the only circuits which respond to simultaneous phase modulation on both guide wires. The circuits for decoding phase modulation pay no attention to minor deviations of the vehicle from the center line of the guide path or to the traversal of code patterns in the floor, because the voltage induced in the reference coil 36 is affected only in a negligible way by such occurrences.

Commands that are produced in the vehicle's logic circuits by the floor codes and by transmissions from the central processor are utilized in a variety of ways. For example, they can blow the vehicle's horn, operate a rotating red safety light at the front of the vehicle, select the speed of the vehicle from among several available speeds, control the acceleration if desired, cause an emergency stop, turn on or off an ultransonic radar detector mounted on the front of the vehicle for detecting approaches to obstacles, and change the range of the ultrasonic detector to long range or short range at different places along the route, as may be appropriate. The vehicle's program control unit, the vehicle control unit, the manual control panel, and the program control panel are provided for manual control, for storage of programs on-board, and for control logic functions which are necessary to convert commands and programs to outputs, for control of the vehicle and its accessories.

What is claimed is:

1. Apparatus for controlling a vehicle comprising first and second parallel current-carrying conductors defining a first portion of a vehicle guide path, means for establishing current in the conductors with the current in said first conductor being out of phase with the current in the second conductor, said conductors establishing a resultant magnetic field having an effective phase different from that of the current in either conductor, said conductors separating at at least one point of divergence to define separate first and second vehicle guide paths along said first and second conductors, each of said separated conductors establishing a magnetic field therearound having a phase different from that of the other conductor and different from said effective phase, sensor means at the vehicle for sensing the magnetic field of the guide path including coil means for sensing said effective phase when the vehicle is on said first portion of the vehicle guide path, phase-responsive circuit means for receiving control signals from said sensor unit and providing an output signal depending upon the relative phase of the input signals thereto from said sensor means, steering means responsive to said output signal to effect steering of the vehicle along the guide path, and means for selectively controlling the phase of one of said control signals received by said circuit means to provide an output signal from said circuit means to make said steering means responsive principally to one or the other of said conductors at said point of divergence so that said sensor unit and said vehicle track one selected conductor of said separate guide paths.

2. Apparatus for controlling a vehicle comprising first and second parallel current-carrying conductors defining a first portion of a vehicle guide path; means for establishing current in the conductors with the current in said first conductor being essentially 90° out of phase with the current in the second conductor; said conductors establishing a resultant magnetic field having an effective phase essentially 45° lagging the phase of one conductor and 45° leading the phase of the other conductor; said conductors separating at at least one point of divergence to define separate vehicle guide paths; each of said separated conductors establishing a magnetic field therearound having a phase different from that of the other conductor and different from said effective phase; sensor means at the vehicle for sensing the magnetic field of the guide path including coil means for sensing said effective phase when the vehicle is on said first portion of the vehicle guide path; phase-responsive circuit means for receiving control signals from said sensor unit and providing an output signal depending upon the relative phase of the input signals thereto from said sensor means; steering means responsive to said output signal to effect steering of the vehicle along the guide path; means for selectively controlling said circuit means to provide an output signal responsive principally to one or the ohter of said conductors at said point of divergence so that said sensor unit and said vehicle track one selected conductor carrying a current of a selected phase from said point of divergence; said phase-responsive circuit means also including phase comparison means having both a reference phase signal and a sense phase signal derived from said sensor unit whose relative phases are compared to determine said output signal; and said means for selectively controlling also including means for selectively altering the phase of said reference phase signal to effect comparison in said phase comparison means of the altered reference phase signal and said sense phase signal.

3. Apparatus as defined in claim 2 wherein said means for selectively altering the phase of said reference signal comprises switch means having plural contacts and a 45° phase shift retard circuit in series with one contact and a 45° phase shift advance circuit in series with another contact, said switch means having means for connecting either one or the other of said 45° phase shift circuits to receive signals from said sensor unit and directing that signal with a phase shift to said phase comparison means.

4. Apparatus as defined in claim 3 wherein said sensor unit comprises a sense coil located so that its axis is disposed vertically of the guide path and a reference coil located so that its axis isdisposed horizontally with respect to the guide path and perpendicular to the guide path.

5. Apparatus as defined in claim 3 wherein code means are located along the guide path for providing code signals to the vehicle, said code means comprising lobes formed by said guide path conductors, and said sensor means comprising means responsive to said lobes.

6. Apparatus for controlling a vehicle comprising first and second parallel current-carrying conductors defining a first portion of a vehicle guide path, means for establishing current in the conductors with the current in said first conductor being out of phase with the current in the second conductor, said conductors establishing a resultant magnetic field having an effective phase different from that of the current in either conductor, said conductors separating at at least one point of divergence to define separate vehicle guide paths, each of said separated conductors establishing a magnetic field therearound having a phase different from that of the other conductor and different from said effective phase, sensor means at the vehicle for sensing the magnetic field of the guide path including coil means for sensing said effective phase when the vehicle is on said first portion of the vehicle guide path, phase-responsive circuit means for receiving control signals from said sensor unit and providing an output signal depending upon the relative phase of the input signal thereto from said sensor means, steering means responsive to said output signal to effect steering of the vehicle along the guide path, means for selectively controlling said circuit means to provide an output signal responsive principally to one or the other of said conductors at said point of divergence so that said sensor unit and said vehicle track one selected conductor carrying a current of a selected phase from said point of divergence, means for changing the phase of the current in said conductors and means responsive to the phase change to provide information for vehicle control.

7. Apparatus for controlling a vehicle comprising first and second electrical current-carrying conductors defining a first portion of a vehicle guide path, means for establishing AC currents in the conductors with the current in said first conductor being out of phase with respect to the phase of the current in the second conductor, said conductors establishing a magnetic field having an effective phase different from that of either conductor, said conductors being separated into lobes to provide code patterns along said guide path with each lobe corresponding to a binary digit depending upon the arrangement of the conductors in the node, said conductors at each node establishing a magnetic field having a phase characteristic dependent upon the conductor arrangement in the node, a sensor unit at the vehicle for sensing the magnetic field of the guide path and the magnetic field of the nodes including sensor coil means for sensing said effective phase during movement of the vehicle along said first portion of the vehicle guide path and the phase of the magnetic fields of said nodes, first phase-responsive circuit means for receiving control signals from said sensor unit and providing an output signal depending upon the phase of the input signal thereto from said sensor means, steering means responsive to said output signal to effect steering of the vehicle along the guide path, and second phase responsive circuit means for receiving control signals from said sensor units and being responsive to the magnetic field of a node and providing an output signal depending upon the second phase characteristic of the magnetic field of the node.

8. Apparatus as defined in claim 7 further including means for establishing current flows in said conductors which are 90° out of phase.

9. Apparatus as defined in claim 8 wherein said lobes establish a magnetic field having a different phase characteristic depending upon the arrangement of the conductors in said lobe, said phase responsive circuit means comprising a phase demodulator circuit which provides an output positive signal on one lobe conductor arrangement and an output negative signal on another output lobe conductor arrangement.

10. Apparatus as defined in claim 9 wherein a 90° phase shifter circuit is interconnected between said phase demodulator circuit and said sensor unit so as to control the phase of one signal to said phase demodulator circuit.

11. Apparatus as defined in claim 10 wherein said sensor unit includes a reference coil located horizontally and perpendicular to the guide path to provide a signal to 90° phase shifter circuit and a sensor coil located vertically to provide a signal to said phase demodulator circuit.

12. Apparatus for controlling a vehicle comprising current-carrying conductor means defining a vehicle guide path, means for establishing current in the conductor means, a central processor for controlling the phase of the current in the conductor means including means for changing the phase of the current in the conductor means, said conductor means establishing a magnetic field having a phase which changes with changes in the phase of the current in the conductor, a sensor unit on the vehicle for sensing the magnetic field of the guide path including sensor coil means for sensing the phase of the magnetic field, circuit means for receiving control signals from said sensor unit and providing an ouptut signal depending upon the phase of the input signal thereto from said sensor means, steering means responsive to said output signal to effect steering of the vehicle along the guide path, and additional circuit means for sensing a change in phase of the magnetic field of said conductor means and providing an output in response thereto whereby data can be transmitted to said vehicle by changing the phase of the current transmitted through said guide path conductor means.

13. Apparatus as defined in claim 12 wherein said conductor means comprises a pair of conductor carrying currents which are 90° out of phase with respect to each other, said conductors establishing a resultant magnetic field having an effective phase different from that of the current in either conductor, said conductors separating at at least one point of divergence to define separate vehicle guide paths, each of said separated conductors establishing a magnetic field therearound having a phase different from that of the other conductor and different from said effective phase, said sensor unit including means for sensing the magnetic field of the guide path including coil means for sensing said effective phase when the vehicle is on a portion of the vehicle guide path when the conductors are together, phase-responsive circuit means for receiving control signals from said sensor unit and providing an output signal depending upon the relative phase of the input signals thereto from said sensor means, and means for selectively controlling said circuit means to provide an output signal responsive principally to one or the other of said conductors at said point of divergence so that said sensor unit and said vehicle track one selected conductor carrying a current of a selected phase from said point of divergence.

14. Apparatus for controlling a vehicle comprising a current-carrying conductor means defining a vehicle guide path, a vehicle movable along the guide path, code means located along the guide path for providing code signals to the vehicle, control means responsive to said code signals for controlling a vehicle operation, steering motor means operable to effect steering of the vehicle along the guide path, and sensor means on the vehicle used in common for sensing said code means and deviations of the vehicle from said guide path, said sensing means comprising at least one sensing coil responsive to vehicle deviation from the guide path and to said code means, circuit means interconnecting said sensing coil with said control means and said steering servomotor means to effect control thereof, said circuit means including phase responsive circuit means and said sensor means including a first coil providing a phase signal and a second coil providing a phase signal and means for selectively modifying the phase of one of said coil signals relative to the other prior to communication of said one signal to said phase responsive circuit means.

15. Apparatus for controlling a vehicle comprising two guide conductors defining a two-conductor portion of a first vehicle guide path and two separate single-conductor guide paths diverging from said two-conductor portion of said first guide path; said two guide conductors carrying alternating currents of differing electrical phases producing magnetic fields which interact along said two conductor guide path; position-sensing circuit means producing an output signal in accordance with the lateral position of the vehicle with respect to said guide conductors and having a preferential phase characteristic to preferentially sense lateral position of the vehicle with respect to the first guide conductor carrying current having a first electrical phase in preference to the second guide conductor having a second electrical phase; steering control means responsive to said output signal to correctively steer said vehicle in a direction to position it laterally in juxtaposition with at least one selectively preferred guide conductor; and phase characteristic controlling means for controlling said preferential phase characteristic of said position-sensing circuit means to prefer selectively one or the other of said first electrical phase or said second electrical phase; whereby said vehicle may be selectively guided along a path defined by one of said single conductor guide paths when said first guide path diverges to form said separate single-conductor portions of said vehicle guide path.

* * * * *